W. TITCOMB.

Cleaner for Locomotive-Boilers.

No. 8,884. Reissued Sept. 2, 1879

Witnesses:
W. H. Kelley
A. H. Plaisted

Inventor:
Winslow Titcomb
by S. W. Bates Atty.

N. PETERS, PHOTO-LITHOGRAPHER, WASHINGTON, D. C.

W. TITCOMB.

Cleaner for Locomotive-Boilers.

No. 8,884. Reissued Sept. 2, 1879.

Witnesses:
W. H. Kelley
C. H. Plaisted

Inventor:
Wm. Low Titcomb
by S. N. Bates
his Atty.

N. PETERS, PHOTO-LITHOGRAPHER, WASHINGTON, D. C.

UNITED STATES PATENT OFFICE.

WINSLOW TITCOMB, OF WATERVILLE, MAINE.

IMPROVEMENT IN CLEANERS FOR LOCOMOTIVE-BOILERS.

Specification forming part of Letters Patent No. 216,911, dated June 24, 1879; Reissue No. 8,884, dated September 2, 1879; application filed August 2, 1879.

*To all whom it may concern:*

Be it known that I, WINSLOW TITCOMB, of Waterville, in the county of Kennebec and State of Maine, have invented a new and useful Improvement in Cleaners for Locomotive and other Boilers, of which the following is a specification, in which—

Figure 1:
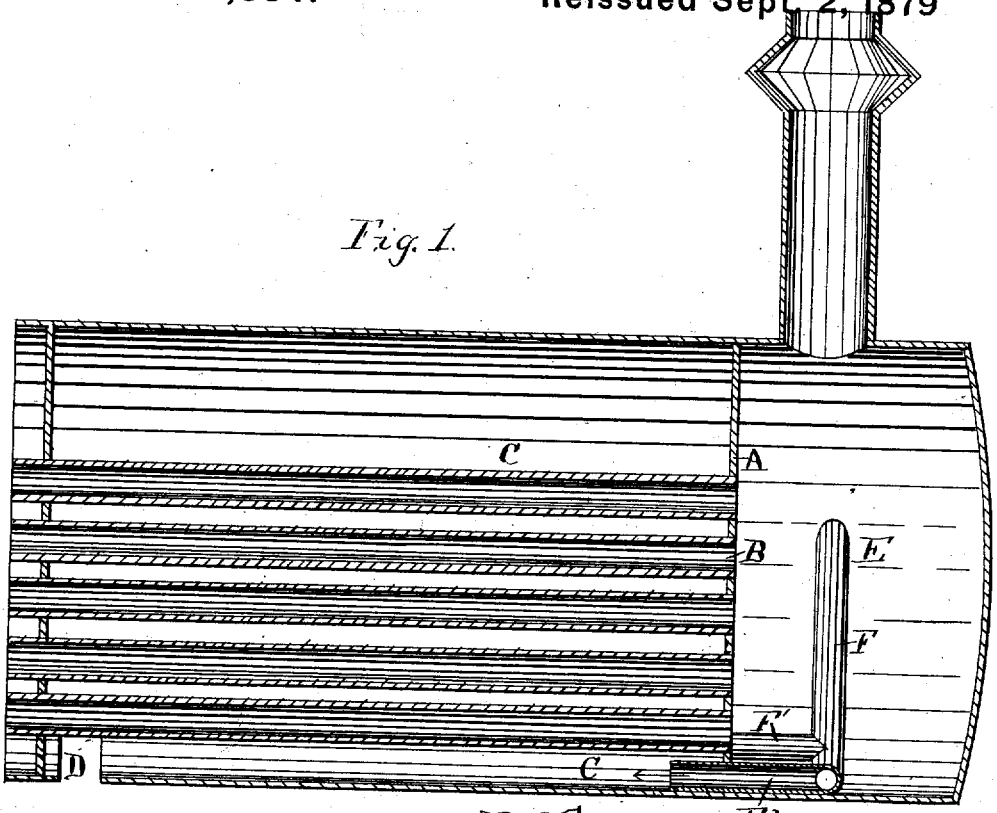
Figure 2:
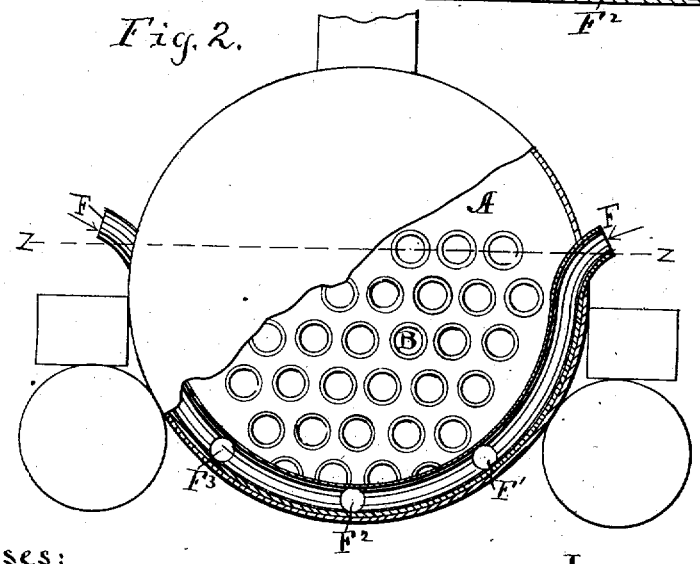
Figure 3:
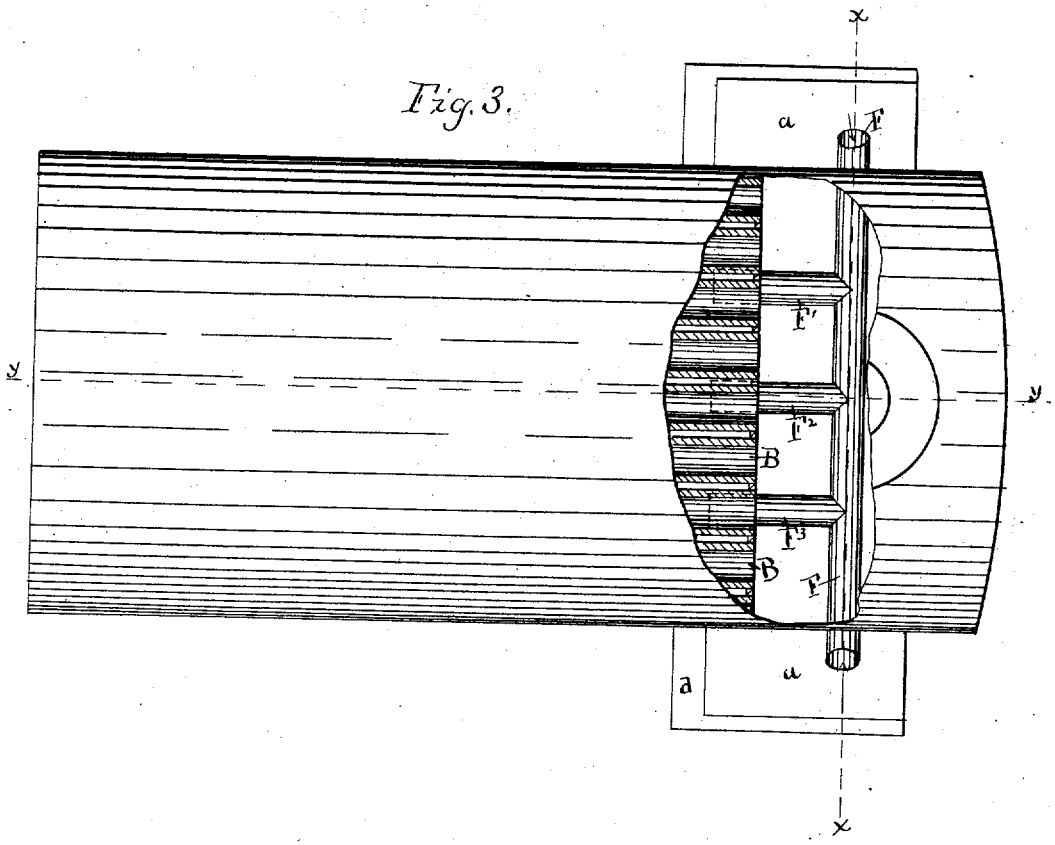

Figure 1 represents section through *y y* of Fig. 3. Fig. 2 represents front elevation, with part section through *x x* of Fig. 3. Fig. 3 shows top view or plan, with part section through *z z* of Fig. 2.

My invention consists of a device for cleaning horizontal tubular boilers, particularly those of locomotives, of the mud and sediment which collects in them, and also of the scales which form on the outside of the tubes.

It consists, in general terms, of a pipe extending from some point outside of the boiler through the shell, and thence, by one or more connecting-pipes, into the bottom of the boiler.

Through these pipes are forced water or steam, which drives the sediment back into the legs or spaces around the fire-box, where it can be easily taken out.

When steam is used it acts on the scales on the tubes, causing them to fall off.

Hitherto the operation of removing the sediment from beneath the tubes of a locomotive-boiler has been attended with great labor, expense, and damage to the locomotive, for, since no means of access to this part of the boiler was provided, the steam-pipes and exhaust-nozzle had to be removed and the ends of the tubes cut off before the bottom of the boiler could be reached, and even then (this operation being deferred two or three years on account of its difficulty) great inconvenience was experienced in removing the sediment, which would often be consolidated into a compact mass, only to be affected by a chisel and hammer. Moreover, the presence of this large quantity of matter in the bottom of the boiler caused a considerable loss of heating-surface. The presence of scales on the outside of the tubes has always been a well-known source of trouble.

The design of my present invention, therefore, is to overcome these difficulties substantially in the manner and by the means I will now more fully in detail set out and explain.

In illustrating my invention by the locomotive shown in the drawings, A is the boiler-head; B B, the tubes; C, interior of boiler; D, opening which connects with the legs or space around the fire-box; E, the smoke-arch.

F is a metal pipe of suitable dimensions. $F^1$ $F^2$ $F^3$ are pipes connected with pipe F, passing through the boiler-head A, and opening into the bottom of the boiler C. The pipe F, which, with its connecting-pipes $F^1$ $F^2$ $F^3$, is the subject of my invention, passes through the shell of the boiler on one side into the smoke-arch, thence around the bottom of the smoke-arch, and out on the other side, connecting at or near the bottom with one or more pipes, $F^1$, $F^2$, &c.

The ends of the pipe F which protrude from the shell are to be supplied with suitable stop-cocks or valves to stop the pipe when not in use, and also with suitable coupling to connect with water or steam pipes, as desired.

When sediment has collected in the bottom of the boiler C or scales have formed on the tubes B B, the boiler C is emptied, one end of the pipe F is connected with the boiler of another locomotive-boiler, and water and steam are forced through the pipes $F^1$ $F^2$ $F^3$ into the boiler C, blowing and washing the sediment back through the opening D into the space around the fire-box, where it can be easily reached. The steam at the same time acts on the scales on the tubes, and causes them to fall off.

Any boiler may furnish steam and water for the purpose shown; or water may be used alone by connecting the pipe F with a hose, when water alone will do the work required; or a steam-chest may be attached to the locomotive to be cleaned, taking steam from the boiler, to be afterward used for cleaning, as described.

My invention can be applied to stationary or other horizontal tubular boilers, as well as those of locomotives, by a suitable arrangement of the pipes F $F^1$, &c.

It is evident that in the mere detail of the manner of applying said pipe or pipes many changes may be made without modifying, essentially, my present invention.

It is also evident that when my device has been once attached to a boiler the expense and labor of cleaning it out in the most thorough manner is very slight, and hence boilers may be kept almost entirely clear from sediment, thus causing a saving of fuel and an increased efficiency of the boiler.

Having thus described my invention, what I consider as new, and wish to secure by Letters Patent, is—

1. In a locomotive or other horizontal tubular boiler, the cleaner-pipe F, extending from outside the boiler into the smoke-arch, and there combined with one or more pipes, $F^1$ $F^2$ $F^3$, which open into the water-space of the boiler, substantially as and for the purposes set forth.

2. In a locomotive or horizontal tubular boiler, a cleaner-pipe, F, extending from the outside to the bottom of the inside of the boiler, and combined with one or more pipes, $F^1$ $F^2$, &c., which open into the water-space in the boiler, substantially as and for the purposes set forth.

WINSLOW TITCOMB.

Witnesses:
W. H. KELLEY,
A. H. PLAISTED.